United States Patent
Mewissen et al.

(10) Patent No.: US 6,687,646 B2
(45) Date of Patent: Feb. 3, 2004

(54) CALIPER

(76) Inventors: Mark W. Mewissen, 1660 North Prospect Ave., #1607, Milwaukee, WI (US) 53202; Anthony J. Abbate, 1660 North Prospect Ave., #1607, Milwaukee, WI (US) 53202

(*) Notice: Subject to any disclaimer, the term of this patent is extended or adjusted under 35 U.S.C. 154(b) by 107 days.

(21) Appl. No.: 09/798,245

(22) Filed: Mar. 5, 2001

(65) Prior Publication Data

US 2002/0123859 A1 Sep. 5, 2002

(51) Int. Cl.⁷ ............... G01B 11/02; G01B 11/14
(52) U.S. Cl. ................................................. 702/161
(58) Field of Search ..................... 702/161, 162, 702/157, 158, 159, 155; 33/809, 784, 810; 324/207.24, 207.17

(56) References Cited

U.S. PATENT DOCUMENTS

| | | | |
|---|---|---|---|
| 3,738,009 A | * 6/1973 | Kuwada | 33/27.03 |
| 3,924,336 A | 12/1975 | Inoue | |
| 4,008,523 A | 2/1977 | von Voros | |
| 4,226,024 A | 10/1980 | Westerberg et al. | |
| 4,229,883 A | 10/1980 | Kobashi | |
| 4,257,107 A | * 3/1981 | Heymsfield et al. | 702/161 |
| 4,566,199 A | 1/1986 | Gruhler et al. | |
| 4,586,260 A | 5/1986 | Baxter et al. | |
| 4,612,656 A | * 9/1986 | Suzuki et al. | 377/24 |
| 4,736,313 A | * 4/1988 | Nishimura et al. | 702/162 |
| 5,022,162 A | * 6/1991 | Luikko | 33/784 |
| 5,056,238 A | * 10/1991 | Chi | 33/810 |
| 5,101,569 A | * 4/1992 | Watkins | 33/203 |
| 5,115,571 A | * 5/1992 | Mackin | 33/558.04 |
| 5,188,121 A | * 2/1993 | Hanson | 600/594 |
| 5,363,566 A | * 11/1994 | Nishina et al. | 33/810 |
| 6,205,672 B1 | * 3/2001 | Paulsen et al. | 33/784 |
| 6,223,136 B1 | * 4/2001 | Geiger | 702/158 |
| 6,279,248 B1 | * 8/2001 | Walters | 33/784 |
| 6,332,278 B1 | * 12/2001 | Bezinge et al. | 33/784 |

* cited by examiner

*Primary Examiner*—John Barlow
*Assistant Examiner*—Demetrius Pretlow
(74) *Attorney, Agent, or Firm*—Norman E. Lehrer

(57) ABSTRACT

A caliper which includes an elongated body with measuring members located adjacent one end of the device where one of the members is slidable relative to the other is disclosed. Located on the body is a digital display and means for programming the device. The device has a scale multiplier that is programmed by the operator. A writing implement such as a pen or the like is attached to the opposite end of the device.

5 Claims, 2 Drawing Sheets

CALIPER

BACKGROUND OF THE INVENTION

The present invention is directed toward an electronic caliper and more particularly, toward a caliper which may be programmed and used as an electronic measuring device for measuring distances on surfaces, such as images and maps, and displaying the actual distances in correct units (by previously entering a scale factor).

There are many types of measuring instruments currently known and used in science and industry for measuring precise but relatively small dimensions. These known instruments include, for example, rulers, micrometers, calipers, and microscopes, depending upon what is being measured and the accuracy required. In general, these known instruments include a scale which is read by a person after the instrument has been manipulated. Some problems encountered with the use of such instruments, however, are human error and difficulty in reading the scale or translating dimensions.

One scientific field in which accurate measurements are vital is medicine. Physicians, for example, currently use pocket protractors in order to determine actual dimensions of an X-ray image. Images are measured utilizing the protractor and the measurement must then be adjusted or scaled to the scale indicated on the X-ray. A dimension can then be calculated. This is, however, a somewhat tedious and inaccurate method for translating the dimensions of an X-ray to the exact dimensions of the anatomy being depicted thereon.

Another example of a measuring device is described in U.S. Pat. No. 4,229,883 to Kobashi. This patent discloses a measuring instrument which includes a digital display. The instrument includes a caliper body with measuring jaws that are moveable toward and away from each other. The measured dimensions may be seen in a digital display. While this patent seeks to eliminate human error in reading the scale, it is still rather large and cumbersome and may be unsuitable when smaller measurements must be taken, for example, from an X-ray.

U.S. Pat. No. 4,566,199 to Gruhler et al. discloses a sliding caliper with measuring beaks and a digital display. While this device and others like it may have advantages over prior manual devices, they are normally too large for a physician to easily carry in his or her pocket. Furthermore, they are not very versatile in that they have use only as a caliper and normally still require that the reading taken be scaled in order to obtain an accurate measurement.

SUMMARY OF THE INVENTION

The present invention is designed to overcome the deficiencies of the prior art discussed above. It is an object of the present invention to provide a caliper which may be programmed and used as an electronic measuring device.

It is another object of the present invention to provide a caliper which is versatile and easy to use.

It is an even further object of the present invention to provide a caliper which includes a writing utensil integral therewith so that the user can immediately record the measurement taken by the device.

In accordance with the illustrative embodiments demonstrating features and advantages of the present invention, there is provided a caliper which includes an elongated body with measuring means located on one end of the device including a member that slidable out of and into the main body of the device. Located on the body is a digital display that displays a distance proportional to the distance that the sliding member is slid out of the body. Within the main body are appropriate electronics and a power source. A number of buttons on the outside of the body are used to program the device and to introduce a scale factor. A writing implement such as a pen or the like is attached to the opposite end of the device for ease in recording the measurement taken by the device.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENTS

Figure 1:
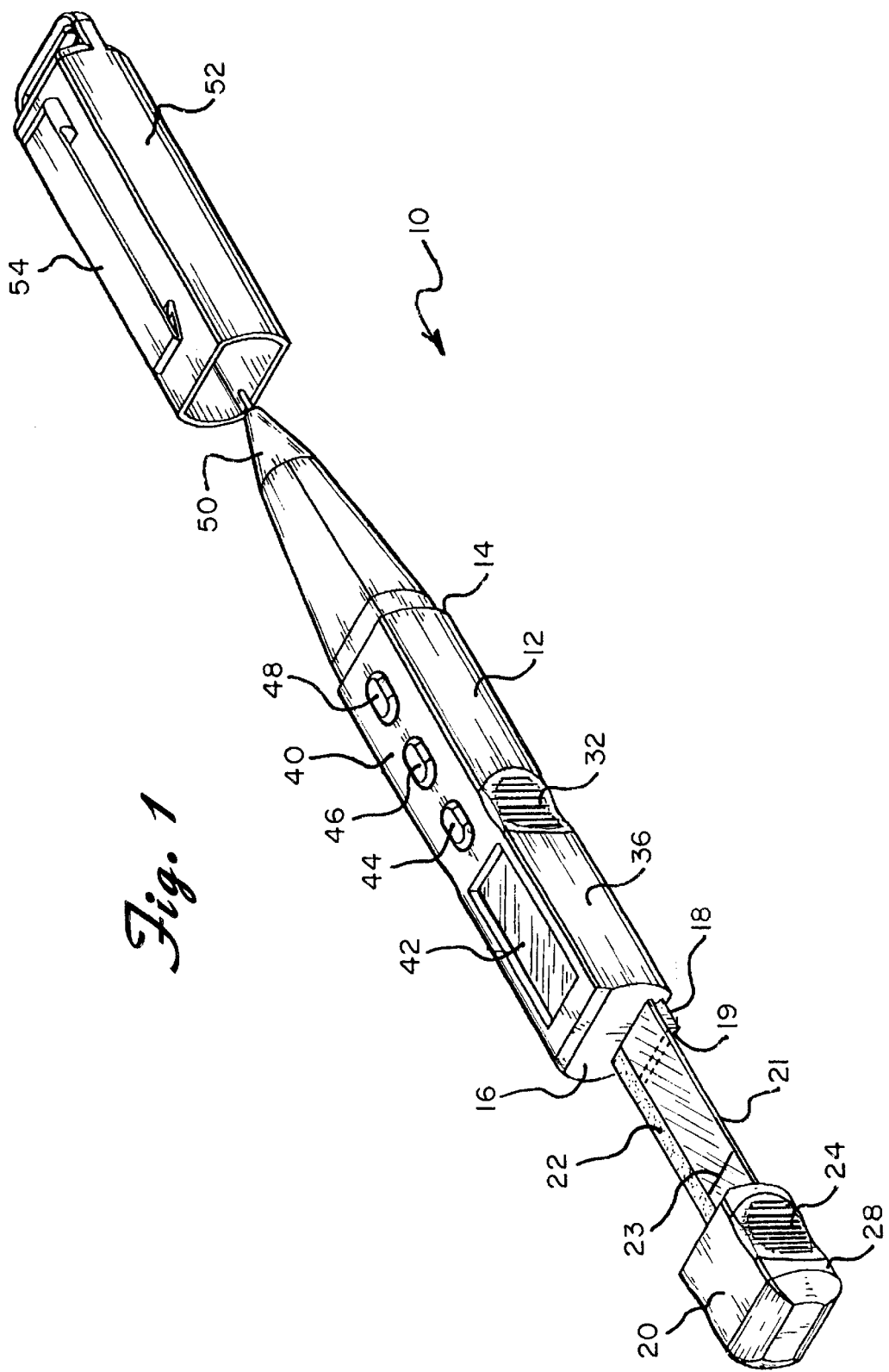
FIG. 1 is a front perspective view of the caliper of the present invention showing the parts separated for clarity.

Referring now to the drawings in detail wherein like reference numerals have been used throughout the various figures to designate like elements, there is shown in FIG. 1 a caliper constructed in accordance with the principles of the present invention and designated generally as 10.

The caliper 10 of the present invention essentially includes an elongated body 12 having a first end 14 and a second end 16. Measuring means are located adjacent the second end 16 of the body 12 and includes two members 18 and 20. Member 18 is essentially a short substantially rectangularly shaped tab extending from the end 16 of the body 12. The free outer edge of the member 18 terminates at an end wall 19. Member 20 is movable relative to the main body 12 and, as best seen in FIG. 1, has one end of a flat rigid elongated transparent element 21 secured thereto. The other end of the element 21 passes or slides into and out of the main body 12 through a suitable opening in the end wall 16. The transparent element 21 includes a magnetic strip 22 that runs lengthwise along an edge thereof and marker line 23 embossed or printed thereon.

Figure 2:
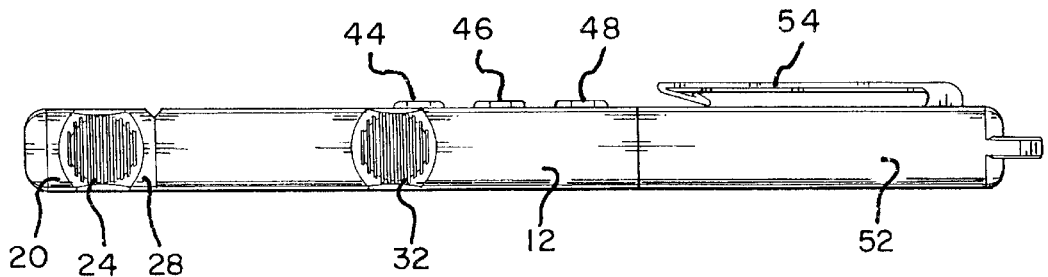
FIG. 2 is side elevational view of the present invention.
Figure 3:
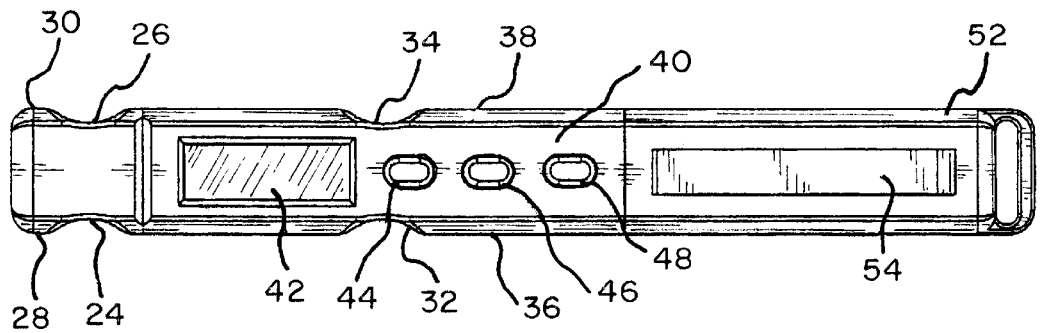
FIG. 3 is top plan view thereof.

The member 20 is slidably movable between an inoperative position such as shown in FIGS. 2 and 3 wherein it lies adjacent the end wall 16 and an operative outer position where it is spaced from the end wall 16 as shown in FIG. 1. When the device is used to take a measurement, the member 20 is pulled or slid outwardly and the transparent element 21 is placed over the X-ray or other document or thing to be measured. The marker line 23 on the element is aligned with one point of the item there below being measured and the end wall 19 of the member 18 is aligned with the other desired point of measurement. Because the element 21 is flat and transparent, it lies flat and the user can easily view the X-ray or other document below. Furthermore, and as can be seen in FIG. 1, the end 19 of the member 18 is visible through the transparent element 21 as illustrated by the dotted line above the end 19.

In order to assist the user in moving the member 20 relative to the main body 12, finger grips 24 and 26 are located along the sides 28 and 30 of the member 20. Similar finger grips 32 and 34 are located along the sides 36 and 38 of the elongated body 12. Located on the top 40 of the body 12 is a digital display 42 and means for programming the device. These means for programming may consist of various buttons, for example, 44, 46, and 48 which control various functions such as on/off, scale factor, re-zero, conversion, and the like.

A writing implement such as a pen 50 or the like extends outwardly from the first end 14 of the device. The sides of the body 12 adjacent the buttons 44, 46 and 48 can be textured to form a gripping surface to aid a person in holding the pen. The size of the entire device 10 is approximately the same size as an writing pen and can be used as such whenever desired. In this regard, a cap 52 is provided for covering the pen 50. The cap 52 preferably has a spring clip 54 secured thereto to attach the device to a person's clothing, such as a pocket, or to another article, such as a clipboard. The cap 52 may also include a neck-strap loop for attaching the device to a chain or necklace worn about a person's neck. Preferably, the body 12, end 20 and cover or cap 52 are made from a transparent or semi-transparent polymeric material. In lieu of the end cap 52, it may also be possible to construct the pen so as to have a retractable tip using any known technology currently available. If a retractable pen is utilized, the spring clip 54 can be mounted on the main body portion 12.

Figure 4:
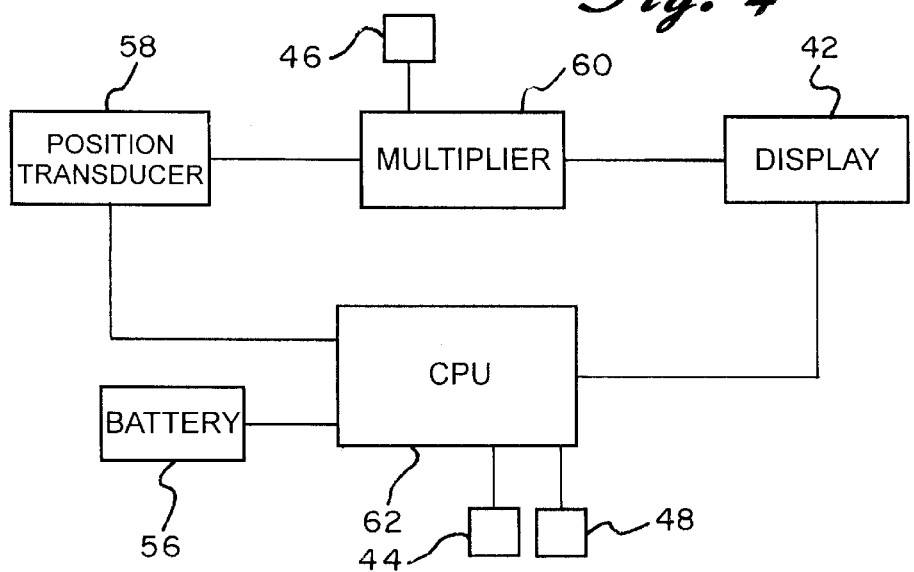
FIG. 4 is a schematic representation of the circuitry within the caliper.

Located within the body 12 are a battery 56 or similar source of power and the electronics and other components needed to operate the caliper, all of which are shown schematically in FIG. 4. The battery 56 may be of the rechargeable type and a jack may be provided for connecting an external power source to the battery for recharging the same.

As the sliding transparent element 22 moves into or out of the body 12, a position indicator transducer 58 generates an electrical signal which is proportional to the distance between the end 19 and the line 23. The position indicator 58 can be any one of a variety of transducers such as disclosed, for example, in U.S. Pat. Nos. 3,924,336; 4,229,883; 4,566,199 or 4,586,260 or substantially any other transducer capable of generating an electrical signal proportional to the distance between two movable elements. In the preferred embodiment of the invention, the position indicator 58 includes a magnetic sensor that reads the distance information written onto the magnetic strip 22. As pointed out above, however, other transducers such as a capacitive sensing system could also be used effectively.

The output from the position indicating transducer 58 is displayed on the digital display 42. Before being displayed, however, it may be modified by a scale factor selected by button 46, for example. Scaling is accomplished simply by multiplying the signal by a scale factor in the multiplier circuit 60. Appropriate scale factors may be selected from a memory which may form a part of the central processing unit 62. As pointed out above, the other buttons 44 and 48 may be used for various other functions such as turning the electronics on or off, calibrating the device, etc. all of which should be readily apparent to those skilled in the art.

In order to use the device, the same is programmed through the use of the buttons according to the needs of the user. The body is then placed adjacent the object to be measured. The body is held by finger grips. The slidable member is pulled outwardly using the finger grips. The electronics of the device will sense the movement and will translate it into a standard measurement according to the scale factor the user has entered into the device. For example, if a measurement is being taken from an X-ray, the scale located on the X-ray will be entered into the device which will be converted into a standard measurement. Once the measurement has been taken, the slidable member is moved back toward the main body and is positioned adjacent the elongated body. Using the pen portion of the device, the user may record the measurement.

While the caliper 10 described above may be self contained, it should be readily apparent to those skilled in the art that it can also be designed to be used as part of a larger system. For example, the caliper 10 could have a port or cable allowing the same to be connected to a computer or palm pilot or the like for data collection or for other purposes. In lieu of a hard wire connection, the caliper 10 could be equipped with a radio frequency or infrared transmitter for transmitting data to a computer or palm pilot.

The present invention may be embodied in other specific forms without departing from the spirit or essential attributes thereof and accordingly, reference should be made to the appended claims rather than to the foregoing specification as indicating the scope of the invention.

We claim:

1. A pocket-size programmable caliper for measuring and scaling a distance on a surface comprising:

an elongated caliper body having a first end and a second end;

measuring means located adjacent said first end of said caliper body, said measuring means including a member slidably mounted to said caliper body, said slidably mounted member being substantially transparent and being adapted to be placed over the article to be measured so that the article may be viewed through said slidably mounted member;

a writing implement secured to said second end of said caliper body, and electronic display means located on said body for displaying a measurement adjusted or scaled to the scale indicated on the surface and a scale multiplier programmed by the operator.

2. The pocket-size programmable caliper as claimed in claim 1 wherein said elongated body further includes at least one finger grip.

3. The pocket-size programmable caliper as claimed in claim 1 wherein said elongated body further includes a cap mountable to said second end.

4. The pocket-size programmable caliper as claimed in claim 1 wherein said substantially transparent member includes at least one marker line thereon.

5. A programmable, pocket-size caliper for measuring and accepting or rejecting an article comprising:

an elongated caliper body having a first end and a second end;

measuring means located adjacent said first end of said caliper body, said measuring means including a member slidably mounted to said caliper body, said slidably mounted member being substantially transparent and being adapted to be placed over the article to be measured so that the article may be viewed through said slidably mounted member;

a writing implement secured to said second end of said caliper body, electronic display means located on said body for displaying "GO"/"NO-GO" and a MIN–MAX range (for the measurement) that is programmed by the operator.

* * * * *